UNITED STATES PATENT OFFICE 2,610,164

COMPOSITIONS OF VINYL CHLORIDE RESINS AND AROMATIC ESTERS OF SULFONATED ALKANES

Earl W. Gluesenkamp, Centerville, and Joachim Dazzi, Dayton, Ohio, assignors to Monsanto Chemical Company, St. Louis, Mo., a corporation of Delaware No Drawing. Application August 20, 1949, Serial No. 111,562

7 Claims. (Cl. 260—30.8)

This invention relates to vinyl chloride compositions having unusual flexibility and high stability at elevated temperatures. More specifically the invention relates to a novel group of plasticizers for vinyl chloride polymers which have unusual efficacy in developing desirable physical properties.

The esters of sulfonated aliphatic hydrocarbons are known chemical compounds, some of which have been used as plasticizers. The esters, which are prepared from petroleum products are mixtures of very many different compounds. They have wide variations in the length and configuration of the aliphatic chain and in the place on the chain where the sulfonic acid group is substituted. Many of the ester mixtures are too volatile for successful application as plasticizers, and others are incompatible and consequently of little value. Other ester mixtures will impart flexibility over a small temperature range, but are of little utility at temperatures below 0° C.

The primary purpose of this invention is to provide new effective compositions for plasticizing vinyl chloride polymers. A further purpose of this invention is to provide vinyl chloride resins which are useful over wide ranges of temperature. A still further purpose of the invention is to utilize abundantly available raw materials of low cost and to prepare useful and inexpensive agents for modifying vinyl chloride resins.

In copending application Serial No. 111,563 filed August 20, 1949, by Earl W. Gluesenkamp and Joachim Dazzi, there are described and claimed esters of sulfonated hydrocarbons having at least 80 percent by weight of aromatic esters of sulfonated alkanes wherein the alkane has from 19 to 21 carbon atoms in its molecule. Such compositions are of unusual utility as plasticizers for vinyl chloride resins.

It has now been found that the optimum length of the aliphatic chain is materially different when the sulfonic acid substituent is in the one position on the chain. When the sulfonic acid group is substituted randomly at a wide variety of positions along the chain the optimum carbon length is approximately twenty. However, if the sulfonic acid group is substituted in a terminal position on a straight chain alkane the optimum plasticizer properties are developed with ten to fourteen carbon atoms in the aliphatic chain. The aromatic esters of alkane sulfonic acids having fewer than ten carbon atoms in the hydrocarbon chain are too volatile for use as general purpose plasticizers. On the other hand, if the aliphatic hydrocarbon chain contains more than fourteen carbon atoms the esters of mixtures thereof are frequently incompatible with the vinyl chloride polymers.

Thus, the useful plasticizers for practicing this invention are the esters corresponding to the following structural formula:

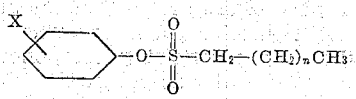

wherein X is a radical of the group consisting of hydrogen, chlorine and methyl, and wherein $n$ is a whole number from eight to twelve.

The new esters may be prepared from 1-olefins as derived from the Fischer-Tropsch reaction, or from the primary n-mercaptans. The 1-olefins may be reacted with hydrogen sulfide or β-mercaptoethanol. The mercaptan, its thial, or the alkyl mercaptoethanols are then oxidized, for example with nitric acid and thereby converted to the corresponding sulfonic acids. The sulfonic acids may be readily converted to the sulfonyl halide which can be reacted with phenol, cresol, or a chlorine substituted phenol. In accordance with these methods the esters will have all of their sulfonic acid groups substituted on a terminal carbon atom of the hydrocarbon chain.

The new esters are valuable plasticizers for polyvinyl chloride and copolymers of more than 70 percent of vinyl chloride and up to 30 percent of other polymerizable monomers copolymerized therewith, for example vinyl acetate and other vinyl esters of monocarboxylic acids, ethyl maleate, ethyl fumarate and other alkyl esters of maleic and fumaric acids.

The plasticizers are blended with the vinyl resin in the conventional manner, for example by mixing on a roll mill, a Banbury type mixer or any other suitable mixing device. The plasticizers are used in proportions necessary to achieve the desired plasticity. Although the quantity of plasticizer will depend upon the particular polymer to be plasticized and upon its molecular weight it is generally found that compositions having from five to 50 percent of plasticizer will in most cases be satisfactory for general utility. Such quantity of plasticizer will generally remain as a permanent part of the vinyl resin and the modified vinyl resin so prepared will not deteriorate or become embrittled by reason of the loss of the plasticizer during use.

The value of the plasticizers are estimated by three tests (1) compatibility (2) volatility and (3) Clash-Berg flex temperature. The compatibility is determined by visual inspection, clarity being a requisite in most applications for vinyl chloride polymers. The volatility is estimated by the test of heating at 105° C. for 24 hours and measuring the percentage of the plasticizers evaporated by loss of weight. The Clash-Berg flex temperature is determined by cooling the polymer sample to about −50° C.

and observing the change in the modulus of rigidity as the sample warms up to room temperature, the flex temperature being that at which the modulus of rigidity is 135,000 pounds per square inch. Of these tests the compatibility is of primary importance while the others are only critical for certain applications. If the polymer is to be subjected to outside weather conditions flex temperatures of −20 to −30° C. are desirable, otherwise 0° C. is satisfactory. If the polymer is to be subjected to elevated temperatures a volatility of five to ten percent is advantageous, otherwise volatilities as high as 25 percent are often not objectionable. The volatilities and flex temperature, of polymer plasticizer blends are difficult to predict and often hav no apparent relationship to the physical constants of the plasticizer.

The new plasticizers are of general utility in softening vinyl chloride polymers. They may be used as the only plasticizing component in a compounded vinyl chloride polymer or they may be used in conjunction with other plasticizers.

Further details of the practice of this invention are set forth with respect to the following specific examples.

*Example 1*

A phenyl ester of 1-dodecane sulfonic acid was evaluated as a plasticizer by milling 40 parts by weight of the ester with 60 parts of polyvinyl chloride and one part of a standard commercially available heat stabilizer. The thoroughly milled sample was molded into appropriate test pieces and tested by means of the Clash-Berg flex temperature procedure and for volatility. The compositions were found to have a flex temperature of −42.2° C. and a volatility of 4.0 percent.

The phenyl esters of dodecane sulfonic acid having the sulfonate group distributed at random throughout the dodecane chain were prepared by direct sulfochlorination of n-dodecane and subsequent reaction with phenol. Polyvinyl chloride samples plasticized with this material were found to have a volatility of 9.2 and a flex temperature of −28° C.

*Example 2*

For the purpose of demonstrating the critical nature of the number of carbon atoms in the hydrocarbon chain, the cresyl ester of the sulfonic acids of n-hexadecane having all of the sulfonate groups substituted on terminal carbon atoms, was prepared but was found to be incompatible, at 40% concentrations.

The phenyl esters of n-octane sulfonic acids prepared by the sulfochlorination method proved to be much too volatile for plasticizer utility. Evaluation experiments showed a volatility of 64.7 percent, although the flex temperature of −37° C. was acceptable.

The invention is defined by the following claims:

1. A plasticized vinyl chloride resin, which comprises a vinyl chloride polymer containing intimately dispersed therein an ester of the following structural formula:

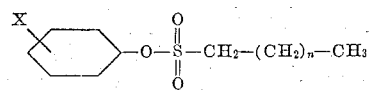

wherein X is a radical of the group consisting of hydrogen, chlorine and methyl, and wherein $n$ is a whole number from eight to twelve.

2. A vinyl chloride resin, which comprises polyvinyl chloride containing intimately dispersed therein an ester of the following structural formula:

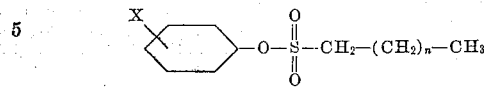

wherein X is a radical of the group consisting of hydrogen, chlorine and methyl, and wherein $n$ is a whole number from eight to twelve.

3. A vinyl chloride resin, which comprises a copolymer of at least 70 percent by weight of vinyl chloride and up to 30 percent of an olefinic monomer copolymerizable therewith, said copolymer having intimately dispersed therein a compound having the structural formula:

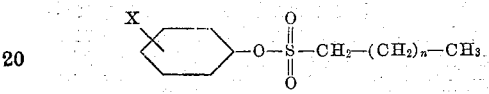

where X is a radical of the group consisting of hydrogen, chlorine and methyl, and wherein $n$ is a whole number from eight to twelve.

4. A vinyl chloride resin, which comprises a copolymer of at least 70 percent by weight of vinyl chloride and up to 30 percent of a monomer of the group consisting of the vinyl esters of carboxylic acid, the alkyl maleates and the alkyl fumarates, having intimately dispersed therein a compound having the structural formula:

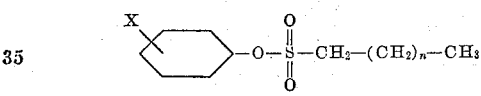

wherein X is a radical of the group consisting of hydrogen, chlorine and methyl, and wherein $n$ is a whole number from eight to twelve.

5. A vinyl chloride composition, which comprises polyvinyl chloride having intimately dispersed therein a phenyl ester of a primary normal alkane sulfonic acid wherein the alkane radical has from ten to fourteen carbon atoms, said ester being from five to 50 percent of the weight of the composition.

6. A vinyl chloride composition, which comprises polyvinyl chloride having intimately dispersed therein a cresyl ester of a primary normal alkane sulfonic acid wherein the alkane radical has from ten to fourteen carbon atoms, said ester being from five to 50 percent of the weight of the composition.

7. A vinyl chloride composition, which comprises polyvinyl chloride having intimately dispersed therein a chlorophenyl ester of a primary normal alkane sulfonic acid wherein the alkane radical has from ten to fourteen carbon atoms, said ester being from five to 50 percent of the weight of the composition.

EARL W. GLUESENKAMP.
JOACHIM DAZZI.

REFERENCES CITED

The following references are of record in the file of this patent:

UNITED STATES PATENTS

| Number | Name | Date |
|---|---|---|
| 2,486,417 | Jackson et al. | Nov. 1, 1949 |

OTHER REFERENCES

Modern Plastics, vol. 24, No. 7, March 1947, pages 154–156, 192 and 194.